Dec. 31, 1929.　　　J. A. STUBBLEFIELD　　　1,742,107
VALVE CONSTRUCTION
Filed Feb. 6, 1929
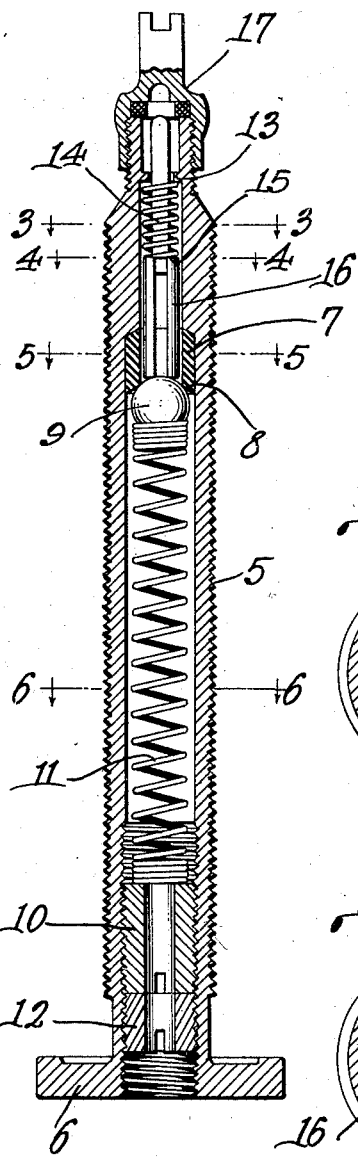
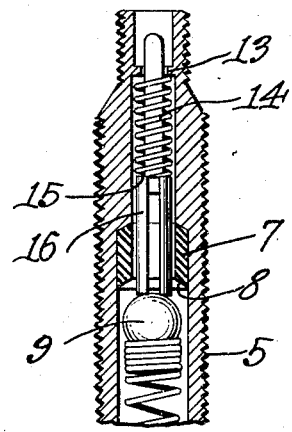
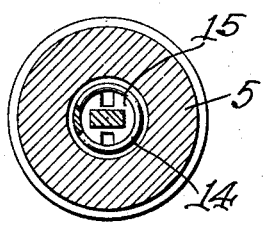
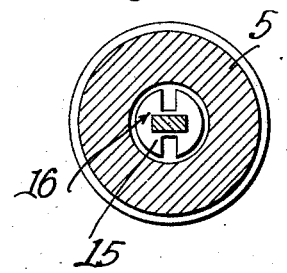
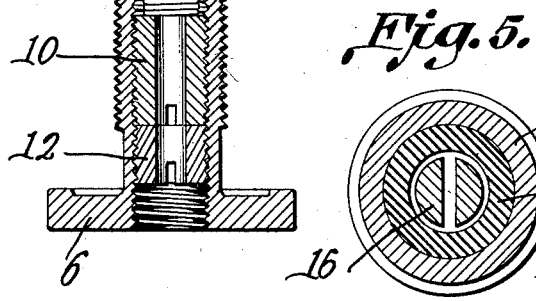
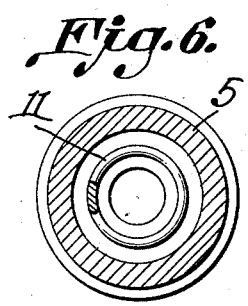
John A. Stubblefield, Inventor Patented Dec. 31, 1929

1,742,107

UNITED STATES PATENT OFFICE

JOHN ARTHUR STUBBLEFIELD, OF BAY CITY, OREGON, ASSIGNOR OF ONE-HALF TO ALTICE EARL MYERS, OF CONDON, OREGON

VALVE CONSTRUCTION

Application filed February 6, 1929. Serial No. 337,881.

This invention relates to air valves especially designed for use in connection with inner tubes of pneumatic tires.

The primary object of the invention is to provide an all metal valve core, a metal valve, and a rubber valve seat against which the metal valve engages to restrict the passage of air through the valve, in one direction.

A further object of the invention is to provide a spring within the valve and on which the ball valve rests, the spring acting to normally urge the ball valve against its seat to the end that the valve will not leak, when the air pressure within the tube to which the valve is secured, becomes low.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a longitudinal sectional view through a valve constructed in accordance with the invention.

Figure 2 is a fragmental sectional view through the upper portion of the valve showing the valve unseated.

Figure 3 is a sectional view taken on line 3—3 of Figure 1.

Figure 4 is a sectional view taken on line 4—4 of Figure 1.

Figure 5 is a sectional view taken on line 5—5 of Figure 1.

Figure 6 is a sectional view taken on line 6—6 of Figure 1.

Referring to the drawing in detail, the body portion of the valve is indicated generally by the reference character 5, and is provided with the usual tube engaging flange 6, whereby the valve may be secured within an inner tube.

The bore of the valve is provided with a shoulder adjacent to one end thereof against which the tubular sleeve 7 engages, the sleeve 7 being constructed of rubber and provided with a beveled portion 8 defining a valve seat. Operating on the valve seat 8, is a metallic ball valve 9 which when engaging the valve seat, will provide an air tight connection between the ball valve and valve seat and prevent the passage of air from the valve.

As clearly shown by Figure 1, the valve is provided with internal threads to accommodate threads of the tubular spring support 10 against which the lower end of the coiled spring 11 engages, the upper end of the spring engaging the ball valve 9 to urge it to the seat 8.

A locking member 12 is forced into close engagement with the member 10 to bind with the member 10 and hold it against accidental movement. Adjacent to the upper end of the valve, is an inwardly extended shoulder 13 against which the coiled spring 14 engages, the lower end of the coiled spring resting on the shoulder 15 of the valve core 16 that has contact with the ball valve 9 to unseat the ball valve 9 when it is desired to release the air from the valve and tube with which the valve is connected.

A valve cap 17 is positioned on the valve to guard the valve against foreign matter entering the valve which would render the valve inoperative.

From the foregoing it will be obvious that due to the construction shown and described, the metallic ball valve 9 seating against the rubber valve seat 8, will insure an air tight connection between the valve and its seat to prevent air from passing from the valve, until the valve 9 has been forced downwardly against the tension of the spring 11 to unseat the valve 9.

I claim:

1. A valve including a body portion, a rubber valve seat positioned in the body portion, a metallic ball valve seated against the valve seat to prevent the passage of air from the valve, a coiled spring engaging the ball valve for normally urging the ball valve to its seat, means for adjusting the tension of the coiled spring, and a spring pressed core contacting with the ball valve and adapted to be operated to unseat the ball valve to release air in the body portion.

2. A valve including a metallic body portion, a valve seat in the body portion, a ball valve normally resting against the valve seat, a spring for urging the ball valve to its seat, a valve core disposed above the ball valve and engaging the ball valve, a spring on the valve core for normally holding the valve core into close engagement with the ball valve, said core adapted to operate to unseat the ball valve, and a cap for the body portion.

In testimony that I claim the foregoing as my own, I have hereto affixed my signature.

JOHN ARTHUR STUBBLEFIELD.